United States Patent [19]

Dakin et al.

[11] 4,375,091
[45] Feb. 22, 1983

[54] METHOD AND APPARATUS FOR INFORMATION RETRIEVAL FROM AN OPTICALLY READABLE STORAGE MEDIUM

[75] Inventors: Wayne R. Dakin, Redondo Beach; Ludwig Ceshkovsky, Fountain Valley, both of Calif.

[73] Assignee: Discovision Associates, Costa Mesa, Calif.

[21] Appl. No.: 295,629

[22] Filed: Aug. 24, 1981

Related U.S. Application Data

[63] Continuation of Ser. No. 920,777, Jun. 30, 1978, abandoned.

[51] Int. Cl.³ .......................... G11B 7/00; G11B 17/00
[52] U.S. Cl. ...................................... 369/32; 365/234; 360/72.2; 358/342; 369/44; 369/111
[58] Field of Search ........................ 358/342; 365/234; 360/71, 72.2; 369/32, 30, 111, 213, 43, 44; 250/202

[56] References Cited

U.S. PATENT DOCUMENTS

| | | | |
|---|---|---|---|
| 3,654,624 | 4/1972 | Becker | 365/234 |
| 3,851,116 | 11/1974 | Cannon | 360/73 |
| 3,927,252 | 12/1975 | Polley | 369/111 |
| 3,931,457 | 1/1976 | Mes | 360/72.2 |
| 4,106,058 | 8/1978 | Romeas | 360/78 |
| 4,138,663 | 2/1979 | Lehureau | 365/215 |
| 4,142,209 | 2/1979 | Hedlund | 360/77 |

FOREIGN PATENT DOCUMENTS

| | | | |
|---|---|---|---|
| 2657916 | 7/1977 | Fed. Rep. of Germany | 360/72.2 |
| 2711923 | 9/1977 | Fed. Rep. of Germany | 360/77 |
| 2399191 | 11/1977 | France | 360/78 |

OTHER PUBLICATIONS

"A Review of the MCA Disco-Vision System", by Broadbent, Jul. 1974 Journal of SMPTE, vol. 83, pp. 554–559.
"A Random Access System Adapted for the Optical Videodisc" by Mathieu-Journal of SMPTE, Feb. 1977, vol. 86, pp. 80–83.

Primary Examiner—Alan Faber
Attorney, Agent, or Firm—Ronald J. Clark

[57] ABSTRACT

A method and apparatus for selectably retrieving information from any of a plurality of spirally-formed information tracks formed in a video disc by means of controlling a carriage for translating the video disc in a forward or a reverse direction relative to radiant beam information recovery means in a video disc player. Each information track is identified by a unique address and means are provided for selecting the address of a particular track to be retrieved. A prescribed sequence of drive signals is applied to a carriage motor dependent on the distance to be traveled by the carriage to retrieve the selected information, the drive signals being successively stepped downward to intermittently redetermine carriage motor speed as predetermined location thresholds are reached during carriage translation.

12 Claims, 6 Drawing Figures

METHOD AND APPARATUS FOR INFORMATION RETRIEVAL FROM AN OPTICALLY READABLE STORAGE MEDIUM

This is a continuation of application Ser. No. 920,777, filed June 30, 1978, now abandoned.

BACKGROUND OF THE INVENTION

This invention relates generally to information retrieval from an optically readable storage medium and, more specifically, to a new and improved method and apparatus for retrieving information from video discs and the like in a rapid and reliable manner.

Video disc players and the like are known for recovering information that has been stored, for instance, as a succession of light reflective and non-reflective regions along spirally-formed information tracks in a disc-shaped record carrier. The record carrier can be rotated at a relatively high rate, while an optical system is employed for directing a radiant beam, such as a laser beam, to impinge upon the information tracks and for gathering a reflected beam that has been modulated by the refective and non-reflective regions of the information track. Such a player includes a carriage for translating the video disc relative to the radiant beam at a rate equal to the pitch of the spirally-recorded tracks and beam steering means for manipulating the radiant beam to precisely follow the path defined by such tracks.

A frequency modulated electrical signal is recovered from the reflected, light modulated beam and is applied to appropriate signal processing circuitry for deriving a video signal for display on a video monitor. Various control signals that are utilized to operate the player are also derived from the reflected beam.

Heretofore, the capability has existed of displaying a selected frame of video information by prescribing the address of the frame or information track wherein it is stored, and causing the carriage to translate in a rapid manner to the vicinity of such information track. The address information has been specially encoded in both of the vertical blanking intervals present in each revolution of an information track comprising the two standard fields of a video frame.

More particularly, in order to retrieve the selected frame or information track, the carriage has been translated at a uniform rate, greater than the normal play speed of the player, towards such information track. During the course of translating the carriage, track addresses of at least some of the tracks crossed were detected, although it is obviously not possible to detect every track address in such a mode of operation. As soon as it was detected that the selected information track had been reached or crossed, the drive signal to the carriage was terminated. Invariably, however, the carriage travelled past the location of the selected track and it was at least necessary to drive the carriage once in the opposite direction to return to it.

By this prior technique, it was determined to always approach the selected information track from one direction when preparing to actually stop the carriage at the track. In other words, if the carriage were driven initially in the normal forward direction for retrieval, after overshooting the selected track the carriage would be driven in the reverse direction past the selected track again. Upon passing the track, the reverse drive signal would be terminated and the carriage would again overshoot. Finally, the normal play mode of the video disc player would be utilized to simply play into and stop at the selected information track.

If the selected track was reached in such a search mode by rapidly translating the carriage in the reverse direction, the carriage drive signal would be terminated upon reaching or passing the selected track, with the accompanying overshoot. From this position the video disc player utilized the normal play mode to play into and stop at the selected track, since the carriage was then located on the proper side for approaching the selected track.

It will be apparent that the aforedescribed techniques for recovering the information stored in selected tracks were prone to deficiencies. For instance, overshoot when approaching the selected track from either the forward or the reverse direction resulted in delays in retrieving the information stored on the track. The requirement of always approaching the selected track from one direction compounded the delay.

Hence, there has been a need for an improved, rapid information retrieval technique for use with video disc players and the like, wherein information is optically recovered by means of a radiant beam being impinged upon an information storage medium, that solves the aforedescribed problems. The present invention fulfills this need.

SUMMARY OF THE INVENTION

Briefly, and in general terms, the present invention provides a new and improved method and apparatus capable of rapidly retrieving information stored in a selected one of a plurality of optically readable information tracks by an information recovery system employing radiant beam information recovery means.

Basically, the present invention includes an improved electronic method and apparatus for controlling movement of an information storage medium, such as a disc-shaped record carrier, relative to a radiant beam that is utilized to recover information by scanning along information tracks formed therein. A particular information track may be targeted for recovery in a retrieval mode of opeation, for instance by specifying an address included with the information in the track. The location of this target track relative to the location of the information track currently being scanned by the radiant beam is monitored and, as a function of the difference in locations, signals are prescribed for controlling relative movement between the target track and the radiant beam in order to rapidly re-position the storage medium relative to the radiant beam to enable scanning of the targeted information track. More specifically, the rate of relative movement is progressively decreased in a prescribed manner, from an initial translation rate determined by the distance separating the radiant beam and the targeted information track. The manner of decreasing the rate of relative movement is selected to intermittently redetermine the rate at predetermined intervals as the radiant beam approaches the target track, and to ensure that the rate is such that the radiant beam will not be caused to overshoot. The separating distance between the target track and the radiant beam may be determined by deriving addresses stored in the information tracks as the radiant beam scans in the retrieval mode and, by comparing these addresses with the address of the target track.

In a presently preferred embodiment, by way of example and not necessarily by way of limitation, a video disc player embodying features of the present invention might include a carriage controller for controlling the position of a carriage on which a video disc is mounted for translation relative to a beam of radiation employed for scanning information tracks on the video disc. A comparison of the address of an information track selected for retrieval with the address the information track being scanned by the beam of radiation is made and a determination is reached whether the carriage should be driven in a forward or in a reverse direction to retrieve the target track. Beam steering means for manipulating the radiant beam to precisely follow the path defined by the tracks in a play mode of operation, may be disabled in the retrieval mode.

As a function of the distance separating the beam of radiation and the target track, the carriage controller prescribes a sequence of drive signals to be applied to a carriage motor for varying the rate of movement of the carriage. For example, the carriage controller may prescribe one of four drive signals, resulting in a particular initial rate of movement, upon determining that the beam of radiation is separated from the target track by at least a particular threshold distance. As the carriage is moved at this initial rate, the separating distance between the beam of radiation and the target track decreases, and another distance threshold may be crossed. In such event, the carriage controller switches a different drive signal of lower magnitude to the carriage motor to effect a slowing of the carriage. Progressive switching of drive signals of lower magnitude is effected upon crossing each prescribed distance threshold until the target track is reached and all drive signals are switched off, thereby stopping the carriage at the target track.

In a further aspect of the present invention, the drive signal applied to the carriage motor immediately prior to stopping at the target track is selected to be the normal play speed of the video disc player. Preferably, switching of this drive signal to the carriage motor also re-enables the beam steering means so that the radiant beam accurately follows the information, and therefore reliably recovers track addresses, as the carriage plays into the target track in the play mode and stops.

In an alternative embodiment of the present invention, monitoring of the separating distance between the target track and the radiant beam is accomplished during an initial portion of the retrieval mode by counting the number of tracks crossed by the radiant beam. Such a technique may be preferable when the carriage is being translated at such a high rate as to make detection of track addresses relatively unreliable. Due to eccentricities inherent in the information tracks, and the need for beam steering means to accurately follow the tracks, monitoring of track addresses is again relied upon as the carriage shifts into the normal play mode prior to stopping at the target track.

The method and apparatus for information retrieval of the present invention satisfies a need for rapid and reliable information retrieval from optically readable tracks by information recovery systems utilizing radiant beam information recovery means.

The above and other objects and advantages of this invention will be apparent from the following more detailed description when taken in conjunction with the accompanying drawings of illustrative embodiments.

DESCRIPTION OF THE DRAWINGS

In the accompanying drawings:

FIG. 6a is a fragmentary cross-sectional view of three information tracks of a video disc, while FIG. 6b is a waveform applicable to the signal recovery subsystem of FIG. 5.

DETAILED DESCRIPTION OF THE PREFERRED EMBODIMENT

Figure 1:
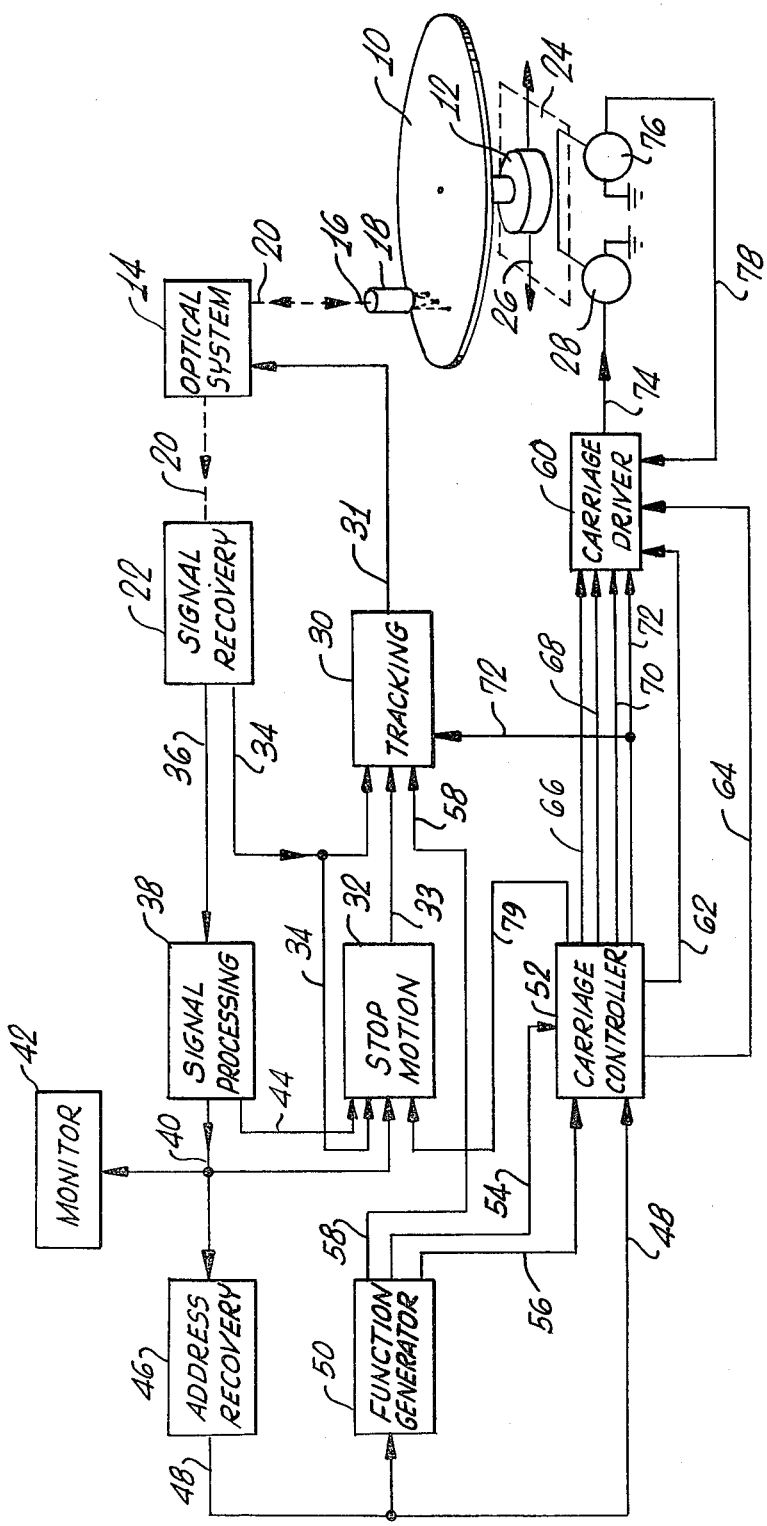
FIG. 1 is a generalized block diagram of a video disc player in which some of the basic concepts of the present invention are illustrated.

Referring now to FIG. 1 of the drawings for purposes of illustration, there is shown a new and improved system for information retrieval embodying features of the present invention. In the drawings, the same numeral will be used in the several views to represent the same element.

In FIG. 1, a generalized video disc player is shown for purposes of illustrating the principles of the invention and includes a spindle on which a video disc 10 is mounted for rotation by a spindle motor 12 at a preselected angular rate. Information is recorded on the video disc 10 in a frequency modulated format as successive light reflective and non-reflective regions along tracks that are formed either as a continuous spiral or in discrete concentric rings. The video disc player also includes an optical system 14 which produces a laser read beam 16 and directs it through an optical read head 18 having an objective lens for focusing the read beam to a precise spot on the video disc 10.

A reflected beam 20, modulated by the information recorded in the tracks, is gathered by the read head 18 and returned through the optical system 14 to a signal recovery subsystem 22. The spindle motor 12 is mounted on a carriage 24 for translation of the video disc 10 in the direction indicated by a double-headed arrow 26 by means of a carriage motor 28. Coarse steering of the read beam 16 along the information tracks is accomplished by translating the carriage 24 either at a uniform rate equal to the pitch of spirally-formed tracks or stepwise if the tracks are formed as discrete concentric rings.

A tracking subsystem 30 is included in the video disc player to enable the read beam to follow eccentricities that are inherent in the information tracks with present technology. Also, since the description that follows will assume that the information tracks are formed in a spiral manner, wherein one complete revolution of the video disc comprises one information track, a stop motion subsystem 32 is shown in FIG. 1 to enable the video disc player to stop or freeze on a particular track. Both the tracking and stop motion subsystems receive a control signal on line 34 from the signal recovery subsystem 22.

The tracking and stop motion subsystems will be described below only as necessary for a full understanding of the present invention. Specific details of these subsystems, as well as further details of certain other subsystems shown in FIG. 1, are disclosed in greater detail in a copending related application of Ceshkovsky et al, entitled "Video Disc Player" Ser. No. 890,670, having a filing date of Mar. 27, 1978, now abandoned, and assigned to the assignee of the present application. Reference is also made to U.S. Pat. No. 3,944,727 entitled "Video Disc Player With Movable Mirror For Directing Light Beams Onto Reflective Disc," inventor James E. Elliott, and also assigned to the assignee of the present application. The disclosures of application Ser. No. 890,670 and U.S. Pat. No. 3,944,727 are hereby incorporated by reference.

The tracking subsystem 30 is employed for maintaining radial tracking of the focused read beam 16 on one information track, and is responsive to the control signal on line 34 to develop an error signal on line 31 to the optical system 14, indicating the offset from the preferred center-of-track position to the actual position. This tracking error signal is employed for controlling the movement of a radial tracking mirror in the optical system 14 to bring the light spot back onto the center-of-track position.

The tracking subsystem 30 normally operates in a closed loop mode of operation when the player is operating at a play speed. However, the tracking subsystem 30 is disabled in a retrieval mode, such that the differential tracking error is temporarily removed from controlling the operation of the radial tracking mirror. The tracking subsystem 30 can also be temporarily disabled by the stop motion subsystem 32, which then generates various combinations of signals on a line 33 to control the movement of the radial tracking mirror for directing the point of impingement of the focused spot from the preferred center of track position on a first track to a center of track position on an adjacent track in order to effect stop motion.

The signal recovery subsystem 22 develops an FM signal that includes the video information and all other information stored in the information tracks, and applies that signal on a line 36 to a signal processing subsystem 38. The latter subsystem includes a conventional FM detector for demodulating the FM signal into a standard format video signal, which is then applied on a line 40 to a video monitor 42 for display and to the stop motion subsystem 32. Means are also included in the signal processing subsystem 38 for separating the vertical sync signal from the video signal so that the sync signal can be applied on a line 44 to the stop motion subsystem 32 to be used in a manner described below.

Each information track or frame of video information that is recorded on the video disc 10 is identified by a unique address encoded once in each of the pair of vertical intervals between the two fields comprising a frame. For purposes of the present invention, the video signal from the signal processing subsystem 38 is also applied on a line 40 to an address recovery subsystem 46, wherein the address associated with each information track is decoded in any manner familiar to those of oridinary skill in the art. These addresses, for instance may be encoded in a selected digital format on a selected horizontal line in each vertical interval.

A signal representing the address information is then directed on a line 48 to a function generator 50 and to a carriage controller 52. The function generator 50, which may be embodied in a remote control, displays the address of the information track currently being read, and includes means for selecting both a retrieval mode of operation and the address of the information track targeted for retrieval, in accordance with the principles of the present invention.

Figure 2:
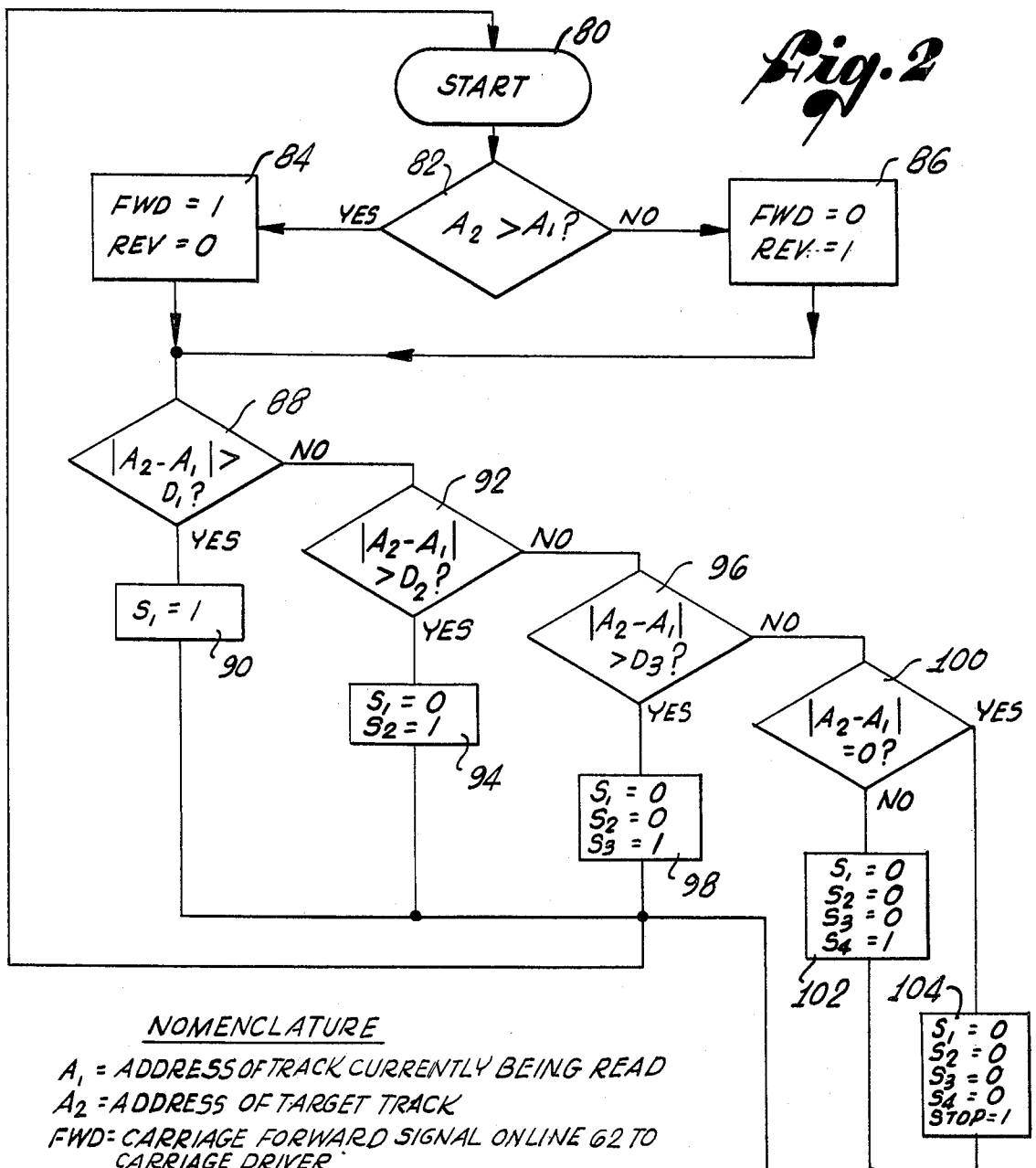
FIG. 2 is a flow chart illustrating an alogorithm applicable to the carriage controller shown in FIG. 1, for varying the carriage speed and direction of movement in the search mode.

In essence, when the retrieval mode is selected, the function generator 50 applies both an enabling signal on a line 54 and the address of the target track on a line 56 to the carriage controller 52, wherein a comparison of the address of the current track being read with the address of the target track is made and a determination is reached whether the carriage 24 should be driven in a forward or reverse direction to retrieve the target track. Also, the carriage controller 52 prescribes a sequence of drive signals to be applied to a carriage driver 60 in order to move the carriage motor 28, and hence the carriage 24 and the video disc 10, to retrieve the target track in a rapid manner without overshooting it. The algorithm by which these determinations are made is illustrated in FIG. 2, and will be described in detail below. The function generator 50 also applies a signal on a line 58 to the tracking subsystem 30 to disable it in the search mode as described above.

The determination of the direction in which the carriage 24 should be driven to reach the target track results in either a forward (FWD) signal being applied from the carriage controller 52 to carriage driver 60 over line 62 or a reverse signal (REV) being applied to the carriage driver on a line 64. In addition, the sequence of signals prescribed by the carriage controller 52, so that the carriage 24 rapidly homes in on the target track, results in one of four carriage drive signals (S1, S2, S3 or S4) being applied to the carriage driver 60 from the carriage controller on one of the lines 66, 68, 70 or 72, respectively. The output of the carriage driver 60 is directed over a line 74 to drive the carriage motor 28, and a tachometer 76 is shown as being mechanically interconnected to the carriage motor to provide an indication of its actual speed and direction by means of a feedback signal on a line 78 to the carriage driver.

The carriage drive signals S1–S4 represent four possible speeds at which the carriage motor 28 can be driven, and hence four rates at which the carriage 24 and the video disc 10 can be translated relative to the read beam 16. One of these drive signals, S4, corresponds to the normal play speed of the video disc player which results in translation of the carriage 24 at a rate equal to the recorded pitch of the information tracks. The other drive signals S3, S2 and S1 correspond to successively greater carriage translation rates.

In accordance with the present invention, the carriage controller 52 prescribes a preferred sequence for applying the drive signals to the carriage motor 28, as a function of the distance between the track currently being read by the player and the track targeted for retrieval in the function generator 50, for retrieval of the information stored in the target track. In this regard, as the carriage moves and the distance to the target track decreases, the drive signal from the carriage driver 60 on line 74 to the carriage motor 28 is sequentially stepped downwardly as a sequence of distance thresholds, D1, D2 and D3 are crossed. This results in a prescribed deceleration of the carriage motor 28 and hence the carriage 24, as the target track is approached (see FIG. 3). When the target track is within a prescribed distance, represented by distance threshold D3, the tracking subsystem 30 is re-enabled by a signal on line 72 from the carriage controller 52. Then, as the target track is reached, all drive signals to the carriage driver 60 are set to zero, and the stop motion subsystem 32 is enabled by a signal on line 79 from the carriage controller 52.

Referring now to FIG. 2, the manner in which the carriage controller 52 determines the direction in which to drive the carriage 24 to retrieve the target track and prescribes an optimum sequence of drive signals is diagrammed. It will be apparent that, in addition to the possibility of implementing the algorithm by means of suitable hardware, such as digital logic elements, all or part of the algorithm may be preferred by conventional programming on a digital computer or a microprocessor.

Initiation of a search mode by the function generator 50 commences with a conventional start step 80, followed by a step 82 in which the question is asked whether the address A2 of the target track (target address) is greater than the address A1 of the track currently being read by the video disc player (current address). An affirmative answer to this question indicates that the proper direction to drive the carriage 24 to retrieve the target track is forward and leads to step 84, resulting in the forward signal on line 62 being set to a true state (FWD=1), while the reverse signal on line 64 is set to a false signal (Rev=0). If the answer is no, then the forward signal on line 62 and the reverse signal on line 64 are set to the false (FWD=0) and the true (REV=1) states, respectively, by step 86.

Once the direction that the carriage is to be driven has been fixed either by step 84 or by step 86, a sequence of steps are utilized to determine the distance D to be traversed to the target track, as represented by the absolute magnitude of the difference between the target address A2 and the current address A1.

More specifically, with reference to FIG. 2, the question is asked at step 88 whether the distance D is greater than the first distance threshold D1 from the target track. If the answer is yes, then the drive signal S1 on line 66 is set to a true state (S1=1) in step 90, resulting in the carriage motor 28 being driven at a particular speed. Since the greatest threshold D1 represents the greatest distance to the target track, the drive signal S1 is selected to cause the carriage motor 28 to operate at its fastest available speed until the next distance threshold D2 is reached. On the other hand, if the answer to the question posed in step 88 is no, then the carriage motor 28 will be driven at a prescribed speed less than the maximum in order that the carriage motor not be driven at such a rate that it could not be stopped without overshooting the target track. Initially the answer to the question posed in step 88 may be no, or course, if the current track being read when the search mode commences is closer to the target than the distance threshold D1.

As mentioned previously, eccentricities in the video disc 10, which are unavoidable with present technology, require utilization of a tracking subsystem 30 such as that shown in FIG. 1 to accomplish fine steering of the read beam to accurately follow the path of the information tracks in a play mode of operation. It was also noted, however that in a retrieval mode of operation as described herein, the tracking subsystem 30 is disabled. Notwithstanding this disablement of the tracking subsystem 30, a certain amount of FM information is recovered from the video disc 10 and provided to the signal recovery subsystem 22 as the read beam 16 rapidly crosses tracks in the search mode.

Although the FM information recovered from the disc is such that the video monitor 42 cannot provide a stable display, sufficient information will be recovered at various intervals to derive the addresses of some tracks as they are crossed. In this regard, identical address information is diametrically encoded for each track, in the vertical interval associated with each field comprising a frame, so that there will be an opportunity to recover address information every half revolution of the disc. If the video disc is rotating at a typical 1800 r.p.m., this will occur once approximately every 16 milliseconds. It is contemplated, therefore, that the alorithm of FIG. 2 is repeated upon each updating of the current address A1, typically at intervals of 16 msec. Thus, after step 90, as well as all other steps wherein a drive signal is set, the algorithm returns to the start step 80 in anticipation of updated information respecting the current address A1.

When the answer to step 88 is no, either because the target track is initially closer to the current track being read than the distance threshold D1, or because the carriage 24 has been driven closer in the search mode at the maximum speed represented by the drive signal S1, the question is posed by step 92 whether the distance D is greater than the next distance threshold D2. If the answer is yes, then the drive signal S1 on line 66 is set to a false state (S1=0) and the drive signal S2 on line 68 is set to a true state (S2=1) by step 94. Consequently, the carriage motor 28 will be driven at a speed corresponding to the drive signal S2, and the carriage controller will remain in this state until the next distance threshold D3 is reached.

From the foregoing, it should now be apparent that a primary purpose of sequentially down stepping the drive signal applied to the carriage driver 60 is to decelerate the carriage motor 28 in a relatively predictable fashion and to intermittently redetermine the speed of the motor as the carriage approaches the target track. In this manner, the effects of variability in the dynamic characteristics of particular carriage motors and carriages is minimized by selecting the drive signals and distance thresholds to allow intermittent redetermination of carriage position and speed during the course of homing in on the target track. As a result, the carriage is driven towards the target as rapidly as practicable without overexciting the carriage motor and possibly experiencing overshoot.

To complete the algorithm, the question is posed at step 96 whether the distance D is greater than the third distance threshold D3 to the target track and, if the answer is yes, the preceding drive signals S1 and S2 are set to a false state (S1=0, S2=0), and the drive signal S3 that is applied on line 70 from the carriage controller 52 to the carriage driver 60 is set to a true state (S3=1) by step 98. When the distance D finally becomes less than the third distance threshold D3, but is still greater than zero, as determined by the next question posed in step 100, the fourth drive signal S4 is set to a true state (S4=1), and all previous drive signals S1, S2 and S3 are set to a false state (S1=0, S2=0, S3=0) by step 102.

It will be recalled that in the presently preferred embodiment, the carriage motor speed represented by the drive signal S4 is chosen to be the normal play speed of the video disc player in which the carriage 24 is translated at a rate equal to the pitch of the spiral tracks formed on the video disc 10. Therefore, the drive signal S4 is also applied on line 72 to the tracking subsystem 30 in order to re-enable it upon re-establishing play speed, since the tracking subsystem 30 was disabled by a signal on line 58 from the function generator 50 upon initiation of the search mode. This was because the various sequential drive signals S1, S2 and S3 all cause the carriage 24 to translate at rates greater than the normal play speed represented by the drive signal S4. At these higher translation rates, it is neither practical nor desirable to attempt to fine steer the read beam 16 as tracks are rapidly crossed. Of course, when the drive signal S4 is applied, the tracking subsystem 30 preferably is re-enabled so that the read beam 16 will most accurately follow the information tracks and track addresses can be reliably retrieved.

Finally, when the difference D becomes zero, making the answer to the question posed in step 100 yes, all previous drive signals S1, S2, S3 and S4 are set to a false state (S1=0, S2=0, S3=0 and S4=0) by step 104. Of course, with all the drive signals S1–S4 set to a false state, the carriage 24 will stop. At the same time, a stop signal on a line 79 to the stop motion subsystem 32 is set to a true state (STOP=1) by step 104. The purpose of this stop signal is enable the stop motion subsystem 32 such that the target track will be frozen on the display of the video monitor 42. Since the information tracks are recorded in spiral fashion, it is required that read beam 16 be jumped back once each revolution of the video disc 10 so that the read beam repeatedly retraces the same frame of video information. A particular manner of generating an appropriate jump-back signal and controlling the tracking subsystem is described in detail in the aforementioned copending related application of Ceshkovsky et al, entitled "Video Disc Player".

Briefly, the stop motion subsystem 32 is employed as a means for generating a plurality of control signals for application to the tracking subsystem 30 on line 33 to achieve the movement of the focused spot tracking the center of a first information track to a separate and spaced location in which the spot begins tracking the center of the next adjacent information track. The stop motion subsystem 32 performs its function by detecting a predetermined signal recovered from the frequency modulated video signal which indicates the proper position within the recovered frequency modulated video signal for initiating the jumping operation. This detection function is achieved, in part, by internally generating a gating circuit conditioned by the vertical sync signal received on line 44 to indicate that portion of the recovered video signal received on line 40, within which the predetermined signal should be located.

In response to the predetermined signal, which has been termed a "white flag" in the aforementioned related application, the stop motion subsystem 32 generates a first control signal for application to the tracking subsystem 30 for temporarily interrupting the application of the differential tracking error to the radial tracking mirrors in the optical system 14. The stop motion subsystem 32 generates a second control signal for application to the radial tracking mirrors for causing the radial tracking mirrors to leave the center of tracking position on a first information track and jump to an adjacent information track. The stop motion subsystem terminates the second control signal prior to the focused spot reaching the center of focus position on the next adjacent information track.

A third control signal may be generated by the stop motion subsystem 32 at a time spaced from the termination of the second control pulse. The third control pulse is applied directly to the radial tracking mirrors for compensating for the effects on it which were added by the second control pulse. While the second control pulse is necessary to have the reading beam jump from a first information track to an adjacent information track, the spaces involved are so small that the jumping operation cannot always reliably be achieved using the second control signal alone. Therefore, the third control signal may be employed for compensating for the effects of the second control jump pulse on the radial tracking mirror at a point in time when it is assured that the focus spot has, in fact, left the first information track and has yet to be properly positioned in the center of the next adjacent information track. Finally, the differential error signal may be gated through to the radial tracking mirror at a time calculated for the gated portion of the differential tracking error to assist the compensation pulse in bringing the focused spot under control upon the center of track position of the next adjacent information track.

Figure 3:
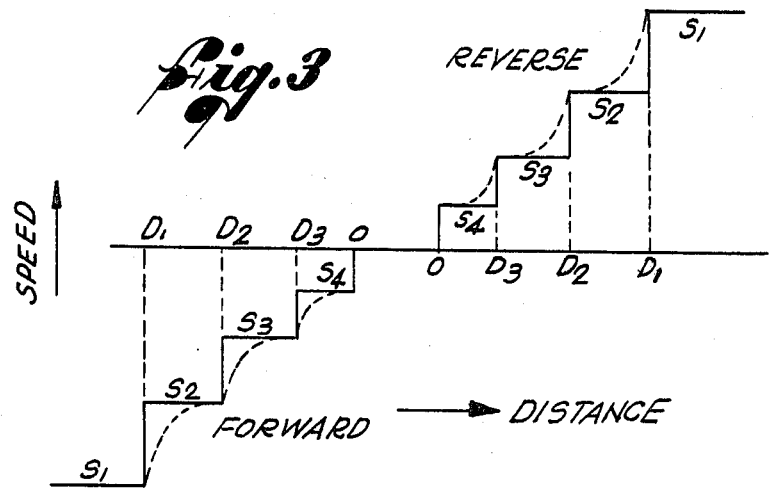
FIG. 3 is a waveform showing the response of the carriage motor as it is driven to a target track in either the forward or the reverse direction.

Referring now specifically to FIG. 3, control of the carriage motor drive signal, and hence carriage motor speed, as a function to the distance D to the target track, is illustrated by waveforms, including approaches from both the forward and the reverse directions.

Assuming for the moment that the carriage 24 is positioned further from the target track than the distance threshold D3 and should be driven in the forward direction to reach the target track, it can be seen that the maximum drive signal S1 is initially applied to the carriage driver 60 so that the carriage motor 28 will assume its maximum available speed. As the carriage 24 approaches the distance threshold D3, the drive signal applied to the carriage driver 60 steps down to S2. Of course, the carriage motor 28 and the carriage 24 have a certain amount of inertia and the speed decays to a speed dictated by the drive signal S2 over a period of time. Preferably, the dynamic characteristics of the carriage motor 28 and the carriage 24 are critically damped so that a speed represented by the drive signal S2 is reached as quickly as possible.

It should be noted that, in any event, the dynamic characteristics of the carriage motor 28 and carriage 24, as well as the distance thresholds such as D3 and D2, should be chosen so that the carriage motor speed does decay to the speed represented by the drive signal S2 prior to the carriage reaching the next distance threshold D2. Otherwise, the purpose of stepping down the drive signal to the carriage driver in order to redetermine the carriage motor speed at particular intervals along route to the target track will be defeated. Those skilled in the art will recognize that particular carriage motors and carriages will display a certain amount of variability in their dynamic response characteristics and that the various drive signals and distance thresholds should be selected with this variability in mind, i.e., sufficient distance between thresholds should be allowed so that even a carriage motor and assembly with a relatively slow time response will decelerate to the speed represented by the next drive signal prior to the next distance threshold being reached.

This process of stepping down the drive signal and allowing the speed of the carriage motor 28 to substantially completely decay before again stepping down the drive signal at the next distance threshold is repeated until the normal play speed represented by drive signal S4 is reached and the tracking subsystem 30 is re-enabled. Then as the carriage 24 reaches the target track, the carriage 24 is stopped and the stop motion subsystem 32 is enabled as described above.

For purposes of convenience, the identical sequence of drive signals and distance thresholds is shown for implementation when the target track must be approached in the reverse direction. For particular systems, it may be that the carriage motor and the carriage will display differing response characteristics in the forward and the reverse directions, in which case a different sequence of drive signals and distance thresholds would be selected. It will also be appreciated that the particular number of drive signals and distance thresholds in the sequence is not critical to the present invention.

Figure 4:
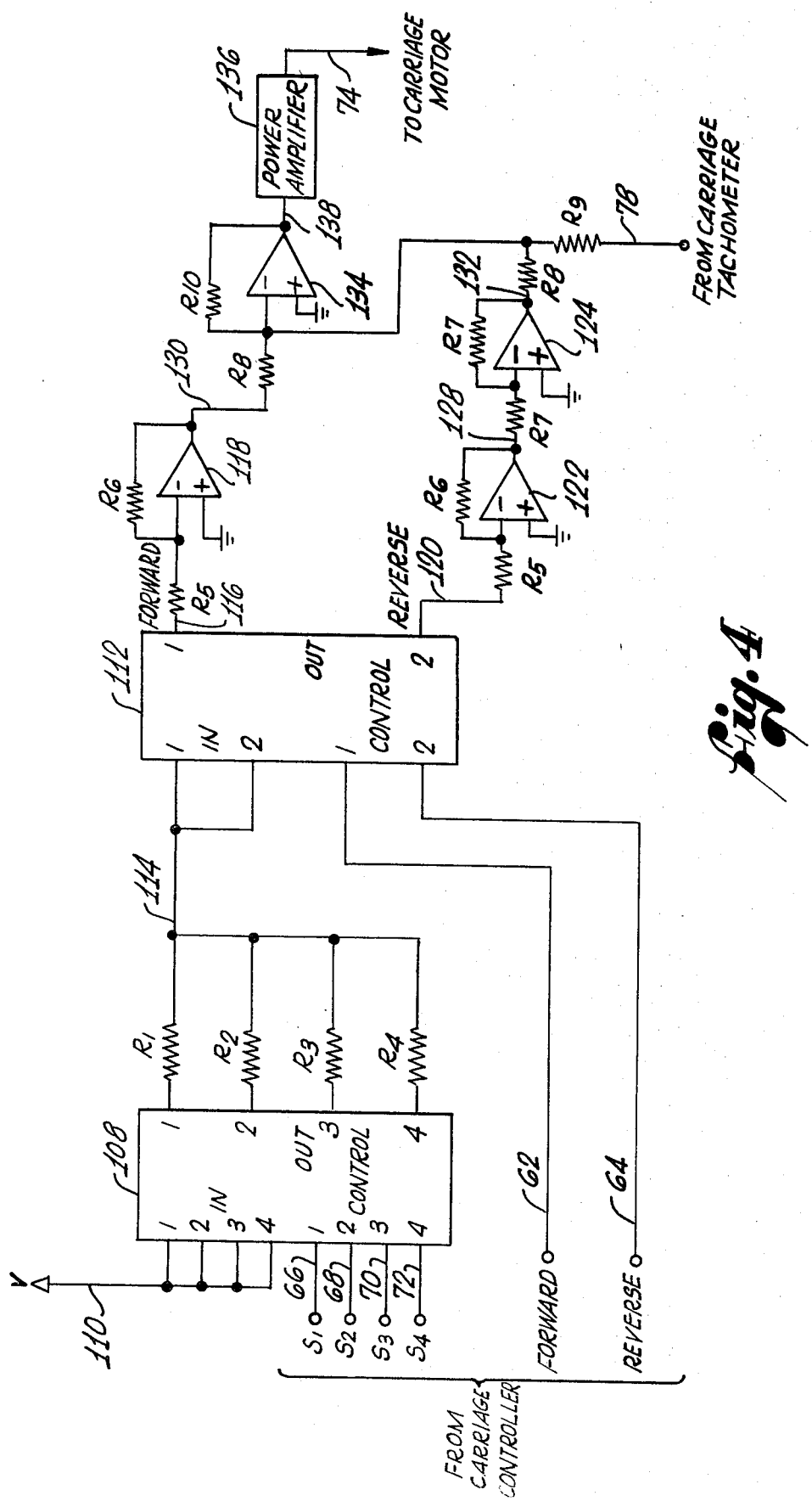
FIG. 4 is an electrical schematic of one embodiment of a carriage driver as shown in FIG. 1 suitable for utilizing the results of the algorithm of FIG. 2.

A particular electrical circuit for implementing the carriage driver is shown in FIG. 4. The circuit includes a first quad analog switch 108 having for IN, OUT and CONTROL connections. The drive signals S1–S4 are applied individually to the four CONTROL connections on the lines 66, 68, 70 and 72, while the four IN connections are tied to a positive supply voltage V on a line 110. The four OUT connections are each connected individually through a resistor R1–R4, respectively, to the first two IN connections of a second quad analog switch 112 on a line 114. The second switch 112 receives its corresponding two CONTROL inputs individually from the forward and reverse signals on lines 62, 64 from the carriage controller 52. Only two connections are utilized on the second analog switch 112. A suitable commercial device for these two quad analog switches is a Motorola type MC14016.

The first OUT connection of the second analog switch 112 is applied through a resistor R5 on line 116 to the inverting input of a first operational amplifier 118 having a feedback resistor R6. The second OUT connection of the second analog switch 112 is likewise applied through an equivalent resistor R5 on line 120 to the inverting input of a second operational amplifier 122, having an identical feedback resistor R6. The output of the second operational amplifier 122 is then applied to the inverting input of a third operational amplifier 124 through a resistor R7 on a line 128, the operational amplifier having an identical feedback resistor R7 to provide unity gain.

The operation of this circuit as thus far described will now be explained. Depending on which, if any, of the drive signals S1–S4 is in a true state, the corresponding OUT connection of the first analog switch will have the supply voltage V applied to it. Thus, a current will be supplied through a particular resistor, such as resistor R1 when drive signal S1 is set to a true state (S1=1), to the two IN connections on the second analog switch 112 on line 114. This current will be directed through either one of the two OUT connections of the second switch 112 depending on which of its two control signals, the forward or reverse signals from the carriage controller 52, are in a true state. Hence, the current will cause an inverted voltage to appear at the output of the first operational amplifier 118 if the forward signal is true (FWD=1). On the other hand, a noninverted voltage will appear at the output of the third operational amplifier 124 if the reverse signal is true (REV=1).

One of these two voltages are then applied through identical resistors R8 on lines 130 or 132 for summing with the feedback signal from the carriage tachometer 76 through a resistor R9 on line 78, at the inverting input of a fourth operational amplifier 134, having a feedback resistor R10. The output of this fourth operational amplifier 134 is then applied to a power amplifier 136 on a line 138 for appropriately energizing the carriage motor 28 over line 74 in the forward or the reverse direction. In accordance with well-known principles, the carriage tachometer 76 is intended to generate an equal and opposite signal to the drive signal from the first operational amplifier 118 or the third operational amplifier 124, as the case may be, to null the input at the fourth operational amplifier 134, i.e., negative feedback control.

An alternative approach for determining carriage location or distance D from the target track can be described with reference to FIGS. 5 and 6.

Figure 5:
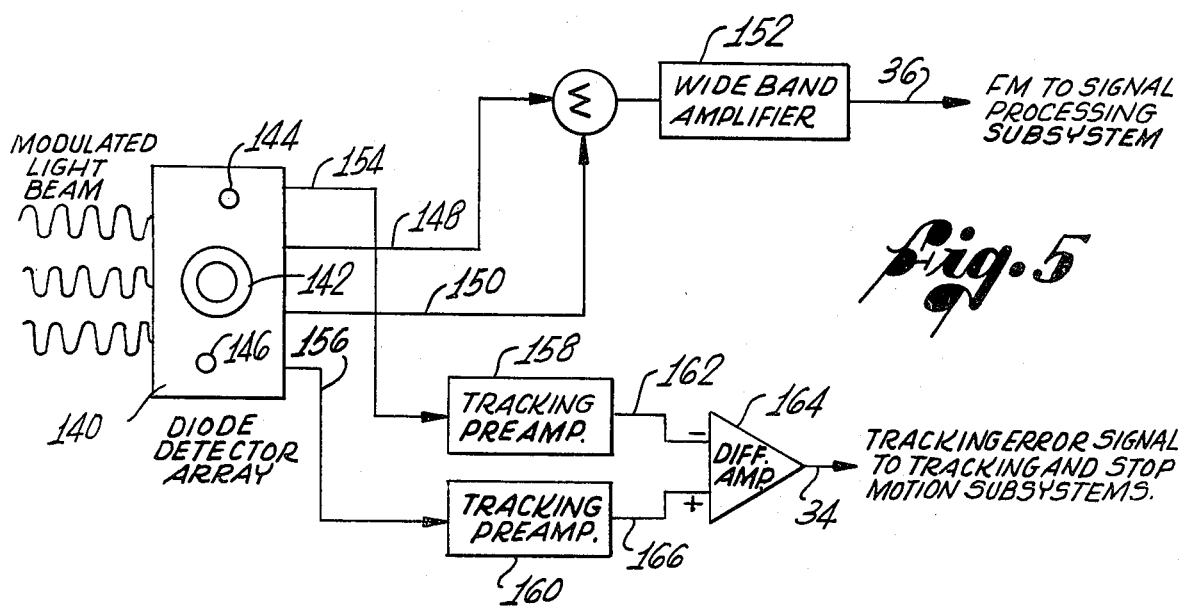
FIG. 5 is a generalized diagram of a signal recovery subsystem, suitable for use with the video disc player of FIG. 1.
Figure 6:
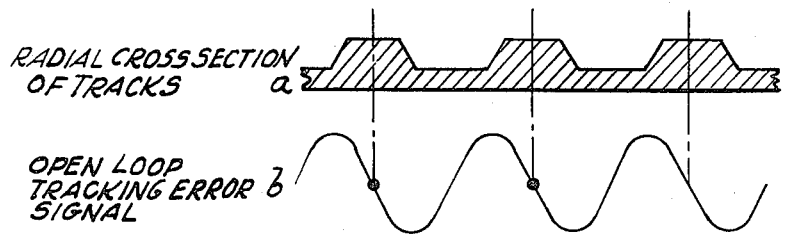

A suitable subsystem for implementing the signal recovery subsystem shown in FIG. 1, is disclosed in FIG. 5. A diode detector array 140 includes a central photodetector 142 for deriving the informational content of the modulated light beam and has a pair of diametrically opposed tracking diodes 144, 146 on either side. An electrical signal proportional to the intensity of light received on the central detector 142 is provided on lines 148, 150 to a summing junction and then to a wide band amplifier 152, having an output directed on line 36 to the signal processing subsystem 38 as described above. Each tracking diode 144, 146 is disposed to detect the portion of the modulated light beam corresponding to individual tracking spots, which are produced by splitting the read beam 16 into three separate beams by means of a diffraction grating in the optical system 14, and each diode generates an electrical signal on lines 154 and 156, respectively, to tracking preamplifiers 158, 160. One preamplier 158 has an output directed on a line 162 to the inverting input of an amplifier 164 and the output of the other preamplifier 160 is directed on a line 166 to the noninverting input of the amplifier. The output of the amplifier 164 then provides a tracking error signal on line 34 to the tracking subsystem 30 and to the stop motion subsystem 32 as directed in connection with FIG. 1.

A fragmentary radial cross section of three tracks of the video disc are illustrated in FIG. 6A; while in FIG. 6B, the open loop differential tracking error signal is illustrated which appears on line 34 at the output of differential amplifier 164 when the tracking subsystem 30 is disabled and the carriage translates rapidly in a search mode of operation.

It will be apparent that the waveform of FIG. 6B can be utilized as an indicator of track crossings and to provide a count of the number of tracks crossed in the search mode. Considering this information in combination with the target address A2 and the address of the particular track from which the search is initiated, a continuous monitoring of carriage position relative to the target track could be derived by counting track crossings. It should be noted, however, that such a technique would be preferable only at relatively high speeds of translation of the carriage. This is because the eccentricities inherent in a video disc tend to create false "track crossings" even when the carriage is standing still, if the tracking subsystem is disabled. At high rates of translation of the carriage, the effects of these false "track crossings" due to eccentricities will not be significant, but as the speed of the carriage slows towards a play speed their effects may prevent an accurate track count. Hence, in an alternative embodiment, it is contemplated that track crossings may be counted by means of the open loop differential tracking error signal at relatively high rates of speed, while dependence will be shifted to detection of addresses as the carriage speed approaches play speed.

The aforedescribed information retrieval system of the present invention satisfies a need for improved systems capable of rapidly accessing information tracks in apparatus of the type utilizing a radiant beam to optically read the information stored in such tracks.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. In an apparatus for selectively retrieving information from a plurality of optically readable information tracks formed in an information storage medium, wherein the information includes addresses uniquely identifying each information track, and the apparatus includes means for impinging an incident beam of radiation upon the storage medium and means for recovering information from a modulated beam of radiation produced thereby, the combination comprising:

first means for selecting a target address corresponding to a target track from which information is to be retrieved in a retrieval mode of operation;

carriage means for moving the storage medium and the incident beam of radiation relative to one another to cause the incident beam to move across said tracks in a search mode of operation;

second means for monitoring the modulated beam to detect addresses from information recovered as the incident beam impinges upon the storage medium while said carriage means is in said search mode of operation;

third means, responsive to both said first means and said second means, for comparing the target address with addresses detected during relative movement between the storage medium and the incident beam in said search mode of operation to produce an indication of the separation between the target and the impingement point of the incident beam; and control means for conditioning said carriage means to decrease the separation between the impingement point of the incident beam and the target track, said control means being responsive to said third means to vary the rate of relative movement in a prescribed manner as the separation decreases, said control means causing said carriage means to cease crossing tracks when said target address is detected.

2. A combination as set forth in claim 1, wherein said control means decreases the rate of relative movement in stepwise fashion as prescribed separation thresholds.

3. In an apparatus for selectively retrieving information from a plurality of optically readable information tracks formed in an information storage medium, wherein the information includes addresses uniquely identifying each information track, and the apparatus includes means for impinging an incident beam of radiation upon the storage medium and means for recovering information from a modulated beam of radiation produced thereby, the combination comprising:

first means for selecting a target address corresponding to a target track from which information is to be retrieved in a retrieval mode of operation;

carriage means for moving the storage medium and the incident beam of radiation relative to one another to cause the incident beam to move across said tracks in a search mode of operation;

second means for monitoring the modulated beam to detect a starting address corresponding to a track from which information is recovered as said search mode of operation is initiated and to detect additional addresses of tracks from information recovered as the incident beam impinges upon the storage medium while said carriage means is in said search mode of operation;

counting means, responsive to variations in the modulated beam representative of movement of the incident beam from track to track, for providing a count of the tracks crossed by the incident beam while said carriage means is in search mode of operation;

third means, responsive to said first means, said second means, and said counting means, for producing an indication of the separation between the target track and the impingement point of the incident beam during relative movement between the storage medium and the incident beam in said search mode, said third means utilizing the count of tracks crossed by the incident beam during said relative movement, in conjunction with said starting address, for comparison with said target address when said separation is greater than a prescribed magnitude, and said third means utilizing addresses detected during said relative movement in said search mode for comparison with said target address when said separation is less than said prescribed magnitude; and control means for conditioning said carriage means to decrease the separation between the impingement point of the incident beam and the target track, said control means being responsive to said third means to vary the rate of relative movement in a prescribed manner as the separation decreases, said control means causing said carriage means to cease crossing tracks when said target address is detected.

4. A combination as set forth in claim 3, wherein said control means decreases the rate of relative movement in stepwise fashion at prescribed separation thresholds.

5. In an apparatus for selectively retrieving information from a plurality of optically readable informatiom tracks formed substantially concentrically in a record-shaped disc, wherein the information includes address uniquely identifying each information track, and the apparatus includes means for impinging an incident beam of radiation upon the disc, means for recovering information from a modulated beam of radiation produced thereby, and beam steering means for manipulating said incident beam to follow the information tracks, the combination comprising:

first means for selecting a target address corresponding to a target track from which information is to be retrieved in a retrieval mode of operation;

means for selectively disabling said beam steering means upon initiation of said retrieval mode;

carriage means for moving the disc and the incident beam of radiation relative to one another to cause the incident beam to move radially across the tracks of the disc in a search mode of operation;

second means for monitoring the modulated beam to detect addresses from information recovered as the incident beam impinges upon the disc while said carriage means is in said search mode of operation;

third means, responsive to both said first means and said second means, for comparing the target address with addresses detected during relative movement between the disc and the incident beam in said search mode of operation to produce an indication of the radial separation between the target track and the point of impingement of the incident beam; and control means for conditioning said carriage means to decrease the separation between the point of impingement of the incident beam and the target track, said control means being responsive to said third means to decrease the rate of relative movement in a prescribed stepwise manner as the separation decreases, said control means re-enabling said beam steering means at a prescribed separation threshold and causing said carriage means to cease crossing tracks when said target address is detected.

6. In an apparatus for selectively retrieving information from a plurality of optically readable information tracks formed substantially concentrically in a record-shaped disc, wherein the information includes addresses uniquely identifying each information track, and the apparatus includes means for impinging an incident beam of radiation upon the disc, means for recovering information from a modulated beam of radiation produced thereby, and beam steering means for manipulating said incident beam to follow the information tracks, the combination comprising:

first means for selecting a target address corresponding to a target track from which information is to be retrieved in a retrieval mode of operation;

means for selectively disabling said beam steering means upon initiation of said retrieval mode;

carriage means for moving the disc and the incident beam of radiation relative to one another to cause the incident beam to move radially across the tracks of the disc in a search mode of operation;

second means for monitoring the modulated beam to detect a starting address corresponding to a track from which information is recovered as said search mode of operation is initiated and to detect additional addresses of tracks from information recovered as the incident beam impinges upon the disc while said carriage means is in said search mode of operation;

counting means, responsive to variations in the modulated beam representative of movement of the incident beam from track to track, for providing a count of the tracks crossed by the incident beam while said carriage means is in said search mode of operation;

third means, responsive to said first means, said second means, and said counting means, for producing an indication of the separation between the target track and the impingement point of the incident beam during relative movement between the disc and the incident beam in said search mode, said third means utilizing the count of tracks crossed by the incident beam during said relative movement, in conjunction with said starting address, for comparison with said target address when said separation is greater than a prescribed magnitude, and said third means utilizing addresses detected during said relative movement in said search mode for comparison with said target address when said separation is less than said prescribed magnitude; and control means for conditioning said carriage means to decrease the separation between the impingement point of the incident beam and the target track, said control means being responsive to said third means to decrease the rate of relative movement in a prescribed stepwise manner at preselected separation thresholds, said control means re-enabling said beam steering means at one of said preselected separation thresholds and causing said carriage means to cease crossing tracks when said target address is detected.

7. A method for use with an apparatus for selectively retrieving information from a plurality of optically readable information tracks formed in an information storage medium, wherein the information includes addresses uniquely identifying each information track, and the apparatus includes means for impinging an incident beam of radiation upon the storage medium and means for recovering information from a modulated beam of radiation produced thereby, said method comprising the steps of:

selecting a target address corresponding to a target track from which information is to be retrieved in a retrieval mode of operation;

moving the storage medium and the incident beam of radiation relative to one another to cause the incident beam to move across the tracks in a search mode of operation;

monitoring the modulated beam to detect addresses from information recovered as the incident beam impinges upon the storage medium as the result of relative movement therebetween during said search mode;

comparing the target address with addresses detected during relative movement between the storage medium and the incident beam in said search mode to produce an indication of the separation between the target and the point of impingement of the incident beam;

decreasing the separation between the point of impingement of the incident beam and the target track, while varying the rate of relative movement in a prescribed manner as the separation decreases; and causing said carriage means to cease crossing tracks when said target address is detected.

8. A method as set forth in claim 7, wherein the rate of relative movement is decreased in stepwise fashion at prescribed separation thresholds.

9. A method for using with an apparatus for selectively retrieving information from a plurality of optically readable information tracks formed in an information storage medium, wherein the information track, and the apparatus includes means for impinging an incident beam of radiation upon the storage medium and means for recovering information from a modulated beam of radiation produced thereby, said method comprising the steps of:

selecting a target address corresponding to a target track from which information is to be retrieved in a retrieval mode of operation;

moving the storage medium and the incident beam of radiation relative to one another to cause the incident beam to move across the tracks in a search mode of operation;

monitoring the modulated beam to detect a starting address corresponding to a track from which information is recovered as said search mode is initiated and to detect additional addresses of tracks from information recovered as the incident beam impinges upon the storage medium in said search mode of operation;

providing a count of the tracks crossed by the incident beams as the result of relative movement between the storge medium and the incident beam in the search mode of operation;

producing an indication of the separation between the target track and the point of impingement of the incident beam during relative movement between the storage medium and the incident beam in said search mode, said indication being produced by utilizing the count of tracks crossed by the incident beam during said relative movement in the search mode, in conjunction with said starting address when said separation is greater than a prescribed magnitude, and said indication being produced by utilizing addresses detected during said relative movement in the search mode for comparison with said target address when said separation is less than said prescribed magnitude;

decreasing the separation between the point of impingement of the incident beam and the target track while varying the rate of relative movement in a prescribed manner as the separation decreases; and causing said carriage means to cease crossing tracks when said target address is detected.

10. A method as set forth in claim 9, wherein the rate of relative movement is decreased in stepwise fashion at prescribed separation thresholds.

11. A method for use with an apparatus for selectively retrieving information from a plurality of optically readable information tracks formed substantially concentrically in a record-shaped disc, wherein the information includes addresses uniquely identifying each information track, and the apparatus includes means for impinging an incident beam of radiation upon the disc, means for recovering information from a modulated beam of radiation produced thereby, and beam steering means for manipulating said incident beam to follow the information tracks, said method comprising the steps of:

moving the disc and the incident beam of radiation relative to one another to cause the incident beam to move radially across the tracks of the disc in a search mode of operation;

monitoring the modulated beam to detect addresses from information recovered as the incident beam impinges upon the disc as a result of relative movement therebetween during said search mode;

comparing the target address with addresses detected during relative movement between the disc and the incident beam in said search mode to produce an indication of the radial separation between the target and the point of impingement of the incident beam;

decreasing the separation between the point of impingement of the incident beam and the target track, while decreasing the rate of relative movement in a prescribed stepwise manner as the separation decreases;

re-enabling said beam steering means at a prescribed separation threshold; and causing said carriage means to cease crossing tracks when said target address is detected.

12. A method for use with an apparatus for selectively retrieving information from a plurality of optically readable information tracks formed substantially concentrically in a record-shaped disc, wherein the information includes addresses uniquely identifying each information track, and the apparatus includes means for impinging an incident beam of radiation upon the disc, means for recovering information from a modulated beam of radiation produced thereby, and beam steering means for manipulating said incident beam to follow the information tracks, the combination comprising:

selecting a target address corresponding to a target track from which information is to be retrieved in a retrieval mode of operaton;

selectively disabling said beam steering means upon initiation of said retrieval mode;

moving the disc and the incident beam of radiation relative to one another to cause the incident beam to move radially across the tracks of the disc in a search mode of operation;

monitoring the modulated beam to detect a starting address corresponding to a track from which information is recovered as said search mode is initiated and to detect additional addresses of tracks from information recovered as the incident beam impinges upon the disc as a result of relative motion therebetween during said search mode;

providing a count of the tracks crossed by the incident beam as a result of relative movement between the disc and the incident beam;

producing an indication of the separation between the target track and the point of impingement of the incident beam during relative movement between the disc and the incident beam in said search mode, said indication being produced by utilizing the count of tracks crossed by the incident beam during said relative movement in said search mode, in conjunction with said starting address for comparison with said target address when said separation is greater than a prescribed magnitude, and said indication being produced by utilizing addresses detected during said relative movement for comparison with said target address when said separation is less than said prescribed magnitude;

decreasing the separation between the point of impingement of the incident beam and the target track while decreasing the rate of relative movement in a prescribed stepwise manner at preselected separation thresholds;

re-enabling said beam steering means at one of said preselected separation thresholds; and causing said carriage means to cease crossing tracks when said target address is detected.

* * * * *

UNITED STATES PATENT AND TRADEMARK OFFICE
CERTIFICATE OF CORRECTION

PATENT NO. : 4,375,091

DATED : February 22, 1983

INVENTOR(S) : Ludwig Ceshkovsky and Ray Dakin

It is certified that error appears in the above-identified patent and that said Letters Patent are hereby corrected as shown below:

Column 6, line 59, delete "downwardly" and insert --downward--.

Column 7, line 10, delete "preferred" and insert --performed--.

Column 8, line 11, delete "is" and insert --be--.

Column 11, line 15, delete "for" and insert --four--.

Column 12, line 36, delete "directed" and insert --described--.

UNITED STATES PATENT AND TRADEMARK OFFICE
CERTIFICATE OF CORRECTION

PATENT NO. : 4,375,091

DATED : February 22, 1983

INVENTOR(S) : Ludwig Ceskovsky and Ray Dakin

It is certified that error appears in the above-identified patent and that said Letters Patent are hereby corrected as shown below:

Column 17, line 53, Claim 11, insert after the phrase "the steps of:" add the following paragraph --selecting a target address corresponding to a target track from which information is to be retrieved in a retrieval mode of operation;--.

Column 18, line 24, Claim 12, delete "operaton" and insert --operation--.

Signed and Sealed this

Twenty-eighth Day of June 1983

[SEAL]

Attest:

GERALD J. MOSSINGHOFF

Attesting Officer

Commissioner of Patents and Trademarks